United States Patent [19]
Fukushima et al.

[11] Patent Number: 5,783,610
[45] Date of Patent: Jul. 21, 1998

[54] HIGH-STRENGTH SYNTHETIC RESIN FOAM AND PROCESS OF FABRICATION THEREOF

[75] Inventors: Toshiharu Fukushima; Takako Itoh, both of Shizuoka, Japan

[73] Assignee: Yamaha Corp., Japan

[21] Appl. No.: 658,647

[22] Filed: Jun. 5, 1996

[30] Foreign Application Priority Data

Jun. 7, 1995 [JP] Japan .................................. 7-140878

[51] Int. Cl.⁶ ........................................... C08J 9/34
[52] U.S. Cl. ..................... 521/51; 264/45.5; 521/142; 521/149; 521/155; 521/182; 521/183
[58] Field of Search ......................... 521/51, 142, 149, 521/155, 182, 183; 264/45.5

[56] References Cited

U.S. PATENT DOCUMENTS

| | | |
|---|---|---|
| 5,158,986 | 10/1992 | Cha et al. . |
| 5,223,545 | 6/1993 | Kumas ........................ 521/51 |
| 5,229,432 | 7/1993 | Muschiatti ................. 521/79 |
| 5,334,356 | 8/1994 | Baldwin et al. . |
| 5,530,032 | 6/1996 | Wayand et al. ............ 521/51 |
| 5,536,458 | 7/1996 | Kawakita et al. .......... 521/51 |

FOREIGN PATENT DOCUMENTS 6506724   7/1994   Japan .

*Primary Examiner*—John M. Cooney, Jr.
*Attorney, Agent, or Firm*—Ostrolenk, Faber, Gerb & Soffen, LLP

[57] ABSTRACT

A structure of synthetic resin foam has a core layer of thermoplastic resin foam and skin layers of non-foamed thermoplastic resin merged with the core layer, and the skin layers gives rise to increase the mechanical strength of the structure.

12 Claims, 8 Drawing Sheets

HIGH-STRENGTH SYNTHETIC RESIN FOAM AND PROCESS OF FABRICATION THEREOF

FIELD OF THE INVENTION

This invention relates to a synthetic resin form and, more particularly, to a high-strength synthetic resin form and a process of fabrication thereof.

DESCRIPTION OF THE RELATED ART

The synthetic resin foam such as urethane foam is small in specific weight, and finds a wide variety of application field. Various kinds of synthetic resin are available for the synthetic resin foam. The volumetrical ratio of synthetic resin foam to the synthetic resin is referred to as "foaming ratio" in the following description.

The specific weight of synthetic resin foam is proportional to the mechanical strength thereof. If synthetic resin is foamed at a high foaming ratio, large synthetic resin cells 1 form the synthetic resin foam, and the specific weight and the synthetic resin foam has a small specific weight and a small strength. The average diameter S1 of the synthetic resin cells 1 is calls as "cell size". For this reason, small synthetic resin cells effectively increase the mechanical strength. However, when synthetic resin is foamed through a conventional foaming process, the cell size is hardly decreased under hundreds microns, and a high-mechanical strength is hardly achieved.

Japanese Patent Publication of Unexamined Application No. 6-506724 discloses a process of forming micro-cells, and the micro-cells formed therethrough have the cell size ranging from 0.1 micron to 30 microns. The synthetic resin foam achieves a fairly large mechanical strength, and widens the application field of the synthetic resin foam. However, if the mechanical strength is further increased, the synthetic resin foam would find a new application field.

SUMMARY OF THE INVENTION

It is therefore an important object of the present invention to provide a structure of synthetic resin foam which has a large mechanical strength.

It is also an important object of the present invention to provide a process of forming synthetic resin foam through which the structure is obtained.

To accomplish the object, the present invention proposes to partially leave thermoplastic resin non-foamed.

In accordance with one aspect of the present invention, there is provided a structure of synthetic resin foam comprising a skin layer of non-foamed thermoplastic resin, and a core layer of thermoplastic resin foam merged with the skin layer and lower in crystallinity than the skin layer.

As shown in FIG. 1, the core layer 11 is formed from micro-cells 12, and the cell size S3 may range from 0.1 micron to 30 microns. The skin layer 13 is higher in crystallinity than the core layer 11, and, accordingly, is hardly foamed. The skin layer 13 gives rise to an increase of the mechanical strength of the structure of synthetic resin foam.

Any crystallizable thermoplastic resin is available for the structure of synthetic resin foam in so far as the crystallinity is changed by impregnating the non-reactive gas. Typical examples of the crystallizable thermoplastic resin available for the present invention are polyethylene terephthalate abbreviated as "PET", polybutylene terephthalate abbreviated as "PBT", polypropylene abbreviated as "PP", polyethylene abbreviated as "PE", polyamide abbreviated as "PA" and polyurethane abbreviated as "PUR". Polyacetal abbreviated as "POM", polyphenylene sulfido abbreviated as "PPS" and polyether ethereal ketone abbreviated as "PEEK" are used as an engineering plastic. The crystalline thermoplastic resin allows the impregnated gas to concurrently form the micro-cells 12 and the skin/core structure 11/12.

The structure of synthetic resin foam may contain a coloring agent, an antioxidant, an anti-static additive, a flame retarder, a lubricant and/or an ultraviolet ray absorbent or two of these additives.

In accordance with another aspect of the present invention, there is provided a process of forming a structure of synthetic resin foam, comprising the steps of: a) preparing a bulk of crystallizable amorphous thermoplastic resin; b) impregnating gas non-reactive with the crystallizable amorphous thermoplastic resin into the bulk of crystallizable amorphous thermoplastic resin at a predetermined temperature under a predetermined pressure so as to obtain a bulk of gas-impregnated material; c) heating the bulk of gas-impregnated material to at least a glass-transition temperature of the thermoplastic resin for partially foaming the bulk of gas-impregnated material, thereby forming a core layer and a skin layer merged with the core layer and larger in crystallinity than the core layer; and d) cooling the core layer and the skin layer under the glass-transition temperature so as to obtain the structure of synthetic resin foam.

The gas does not react with the amorphous material, and may be carbon dioxide gas or nitrogen gas. The temperature, the pressure and time period are important parameters for controlling the gas impregnating step c), and are appropriately selected depending upon the thermoplastic resin to be employed and the width of the skin layer to be required. The impregnation of the gas promotes the crystallization of the amorphous thermoplastic resin.

The amorphous thermoplastic resins available for the process are identical with those described hereinbefore, and crystalline thermoplastic resins may be converted to the amorphous thermoplastic resins through a quenching. The amorphous thermoplastic resins may contain a coloring agent, an antioxidant, an anti-static additive, a flame retarder, a lubricant and/or an ultraviolet ray absorbent.

The gas-impregnated material may be heated in hot oil open to the atmosphere, i.e., at the atmospheric pressure, and the hot oil heats the gas-impregnated material to or over the glass-transition temperature ranging between 40 degrees to 200 degrees in centigrade. The bulk of gas-impregnated material may be dipped into the hot oil regulated to or over the glass-transition temperature.

A hot pressing may be available for the step d). The bulk of gas-impregnated material is placed in a mold, and the gas-impregnated material is heated to or over the glass-transition temperature in the mold under application of pressure. In this instance, the foaming ratio is mainly controlled by the thickness.

When the core layer and the skin layer is cooled below the glass-transition temperature, the cooling step e) determines the configuration of the structure of synthetic resin foam. The cooling may be carried out by dipping the core and skin layers into water.

BRIEF DESCRIPTION OF THE DRAWINGS

The features and advantages of the structure of synthetic resin foam and the process according to the present invention will be more clearly understood from the following description taken in conjunction with the accompanying drawings in which.

DESCRIPTION OF THE PREFERRED EMBODIMENTS

First Embodiment

Amorphous polyethylene terephthalate sheets were firstly prepared, and were sold by Electric Chemical Industry Corporation as "A-PET". The amorphous polyethylene terephthalate sheets measured 1 millimeter in thickness, 50 millimeter in width and 50 millimeters in length. The amorphous polyethylene terephthalate sheets were put in a pressure vessel. Carbon dioxide gas was impregnated into the amorphous polyethylene terephthalate sheets for twenty two hours under the conditions described in Table 1, and each specimen has five samples. The present inventors measured the increment of each amorphous polyethylene terephthalate sheet after the gas impregnation, and calculated an average increment of the five samples.

TABLE 1

| Specimen | Pressure (kg/cm$^2$) | Temperature (°C.) | Average Increment (percent) |
|---|---|---|---|
| 1 | 40 | 25 | 2.7 |
| 2 | 40 | 40 | 2.4 |
| 3 | 40 | 80 | 1.6 |
| 4 | 80 | 25 | 6.1 |
| 5 | 80 | 40 | 6.1 |
| 6 | 80 | 80 | 3.0 |
| 7 | 120 | 25 | 6.5 |
| 8 | 120 | 40 | 6.5 |
| 9 | 120 | 80 | 4.0 |
| 10 | 160 | 25 | 6.9 |
| 11 | 160 | 40 | 6.7 |
| 12 | 160 | 80 | 4.5 |
| 13 | 200 | 25 | 6.9 |
| 14 | 200 | 40 | 7.0 |
| 15 | 200 | 80 | 5.0 |

The gas-impregnated polyethylene terephthalate sheets were heated in hot oil at 150 degrees in centigrade. The hot oil was prepared in a tub open to the atmosphere, and the gas-impregnated polyethylene terephthalate sheets were dipped in the hot oil for 30 seconds. While the hot oil was heating the gas-impregnated polyethylene terephthalate sheets, the gas-impregnated polyethylene terephthalate sheets were foamed. After the foaming in the hot oil, the sheets were taken out from the hot oil, and were quenched.

The present inventors cut the specimens, and observed the cross sections by using a microscope. The present inventors checked the structure exposed to the cross section to see whether or not the skin/core structure had been formed.

Figure 1:
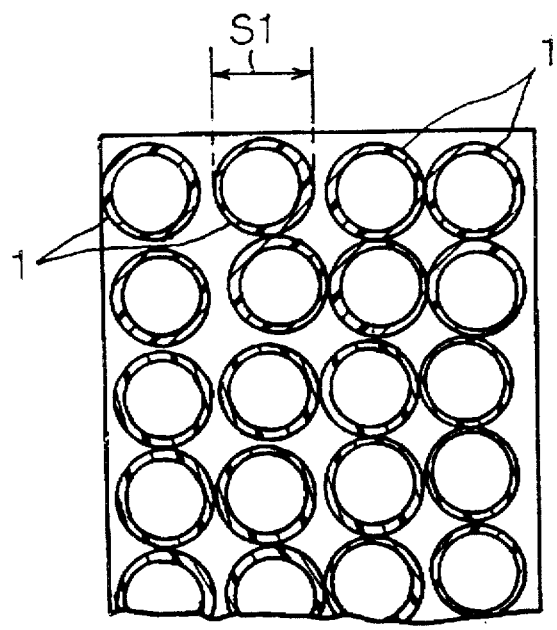
FIG. 1 is a schematic cross sectional view showing the structure of he prior art synthetic resin foam.
Figure 2:
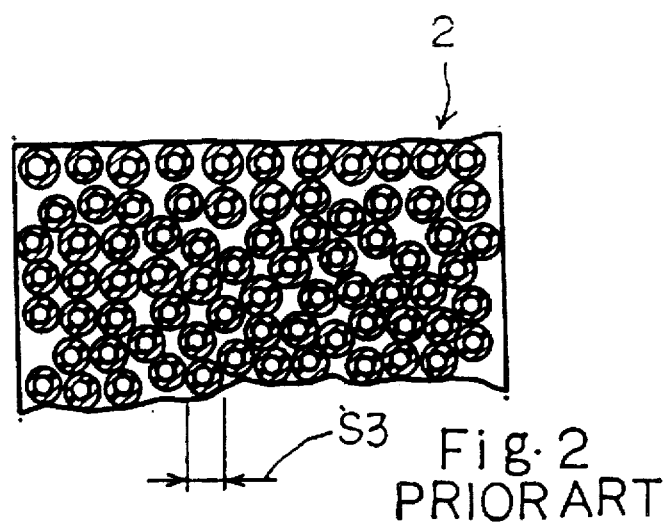
FIG. 2 is a schematic cross sectional view showing the structure of the prior art synthetic resin foam disclosed in Japanese Patent Publication of Unexamined Application No. 6-506724.
Figure 3:
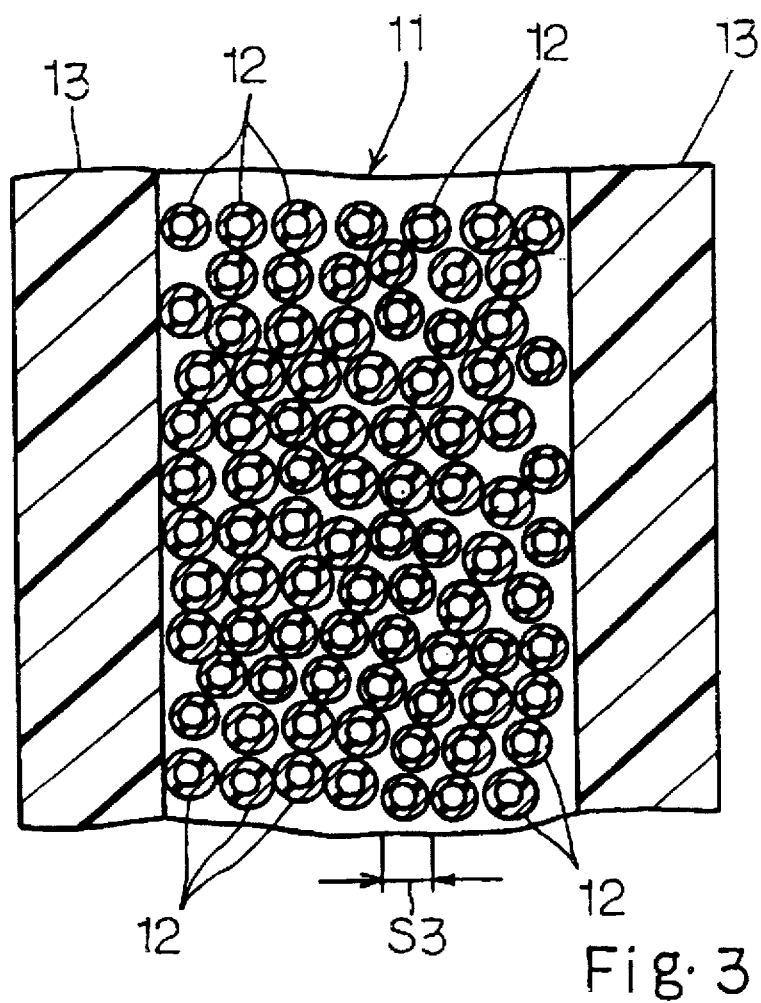
FIG. 3 is a schematic cross sectional view showing the structure of synthetic resin foam according to the present invention.
Figure 4:
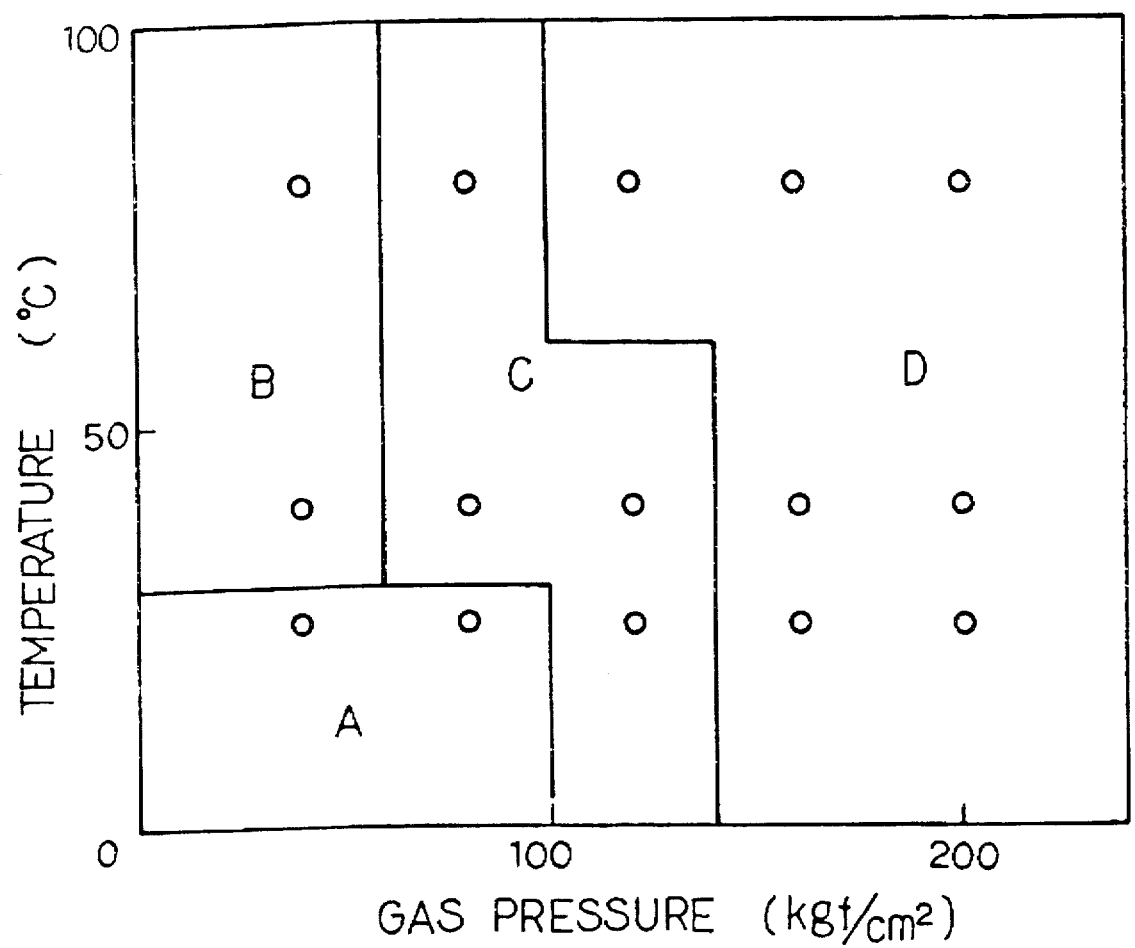
FIG. 4 is a graph showing relation between the structure of specimens and gas impregnating conditions.

FIG. 4 shows the structure observed by the present inventors and the gas impregnation conditions. The specimens imperfectly impregnated with the gas were plotted in area "A", and area "B" stood for the specimens where the gas was uniformly impregnated but no skin layer was formed. The skin/core structure was observed in area "C", and the specimens with the skin layers only were plotted in area "D".

The present inventors concluded that the skin/core structure was obtained at 40 degrees to 80 degrees in centigrade under 80 kgf/cm$^2$ and at 25 degrees to 40 degrees in centigrade at 120 kg/cm$^2$. Therefore, the recommendable gas impregnating conditions for the polyethylene terephthalate ranges from 80 kgf/cm$^2$ to 120 kgf/cm$^2$ between 25 degrees in centigrade and 80 degrees in centigrade.

The thickness of the skin layer is controllable by changing the time period for the gas impregnation. If the skin layer is thick, the synthetic resin foam has large mechanical strength. On the other hand, if the core layer is thick, the synthetic resin foam has a large elastic modulus. Therefore, the mechanical properties of the skin/core structure is regulable.

Figure 5:
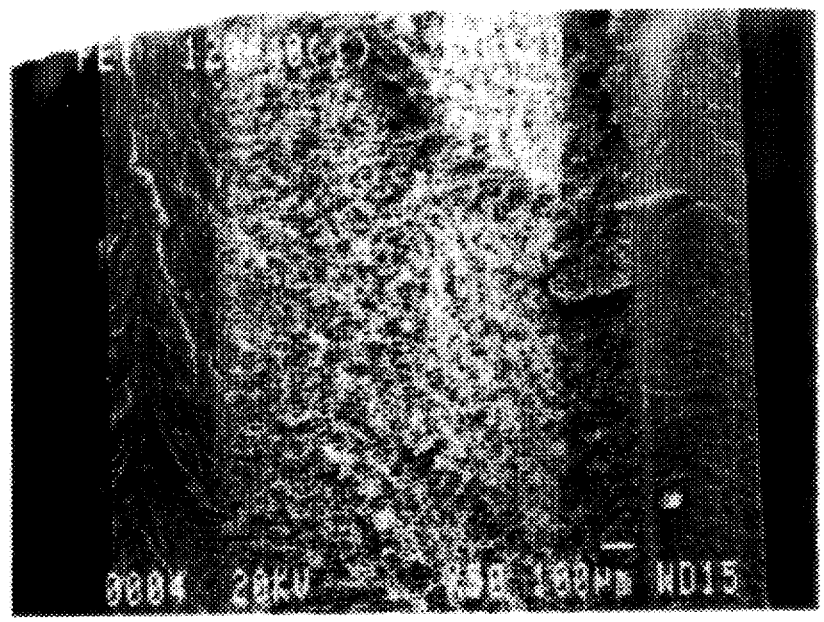
FIG. 5 is a micro-photograph taken by an electron microscope.
Figure 6:
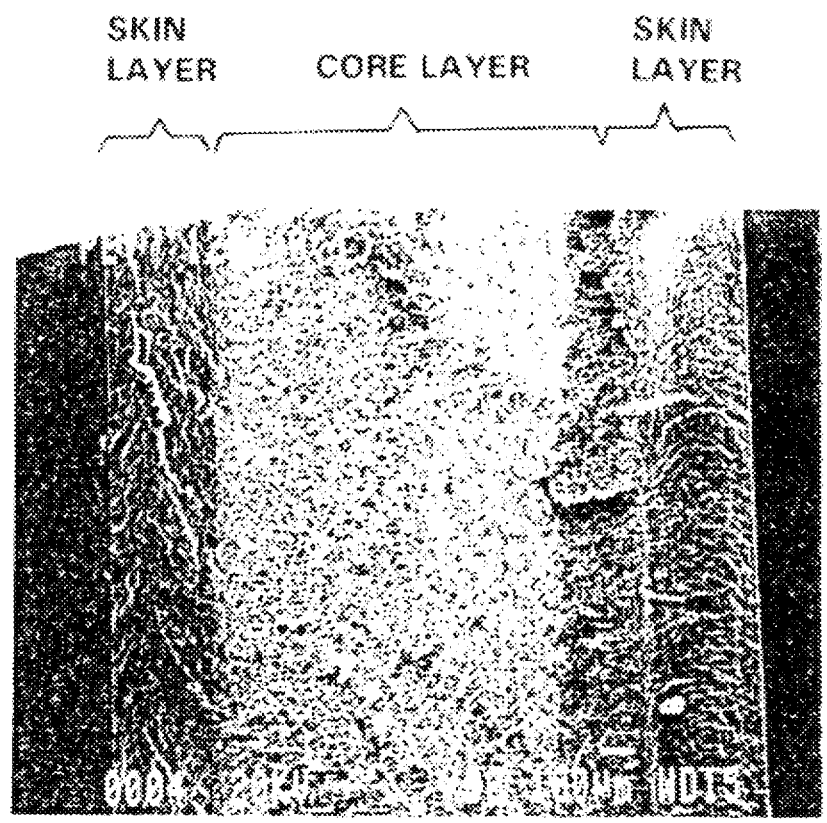
FIG. 6 is a photo-copy of the micro-photograph.

FIG. 5 shows the structure exposed to the cross section of specimen 8, and the skin layer and the core layer are clearly formed.

The present inventors further carried out a differential scanning calorimetry on the specimens, and FIGS. 7 to FIG. 10 shows the results of the differential scanning calorimetry.

Figure 7:
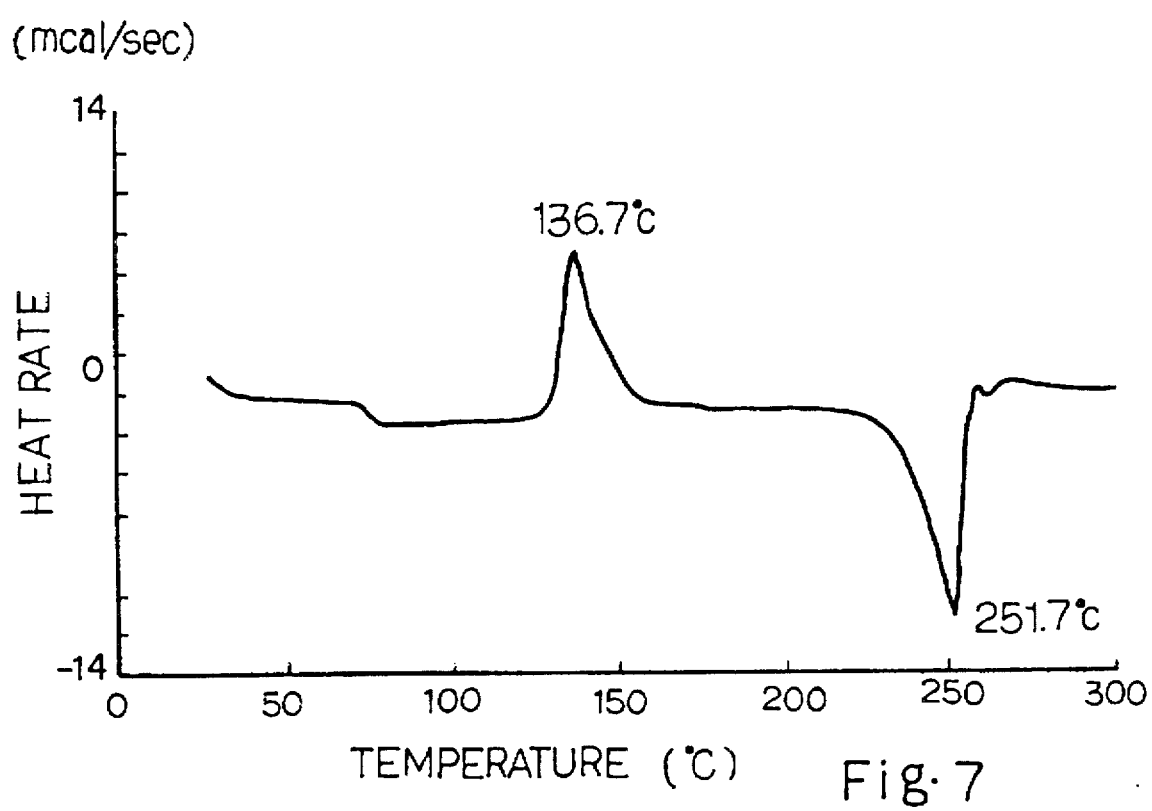
FIG. 7 is a graph showing a result of a differential scanning calorimetry measured on amorphous polyethylene terephthalate.

FIG. 7 shows the result of the differential scanning calorimetry on the amorphous polyethylene terephthalate, and an exoergic peak due to the crystallization and an endoergic peak due to the fusion took place at 137 degrees in centigrade and at 252 degrees in centigrade, respectively.

Figure 8:
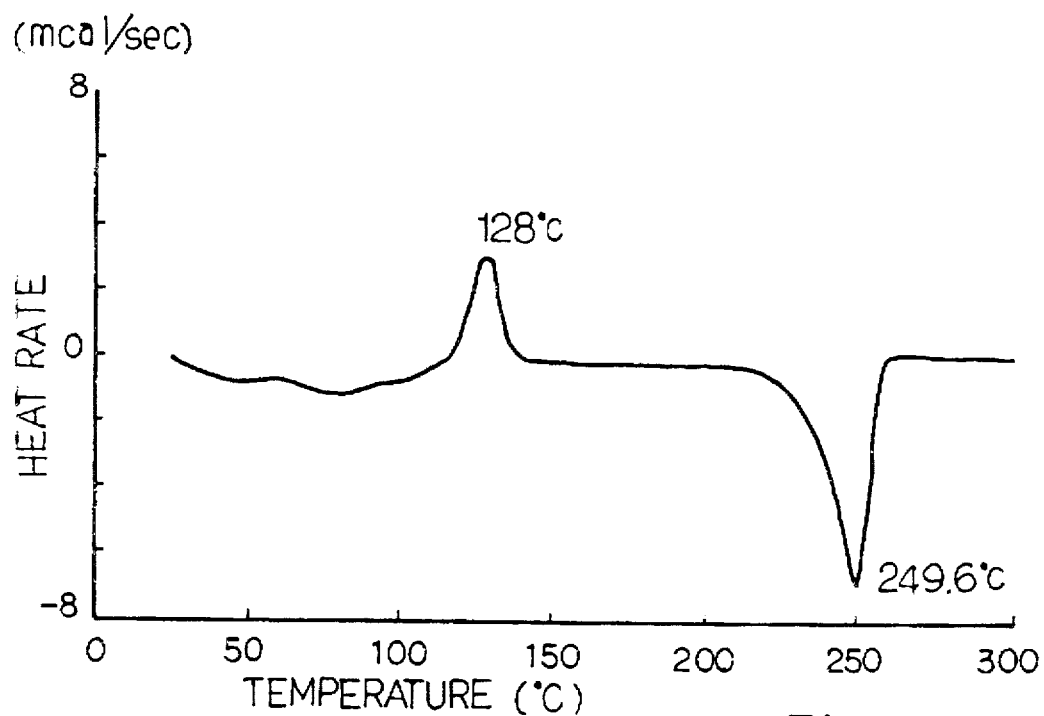
FIG. 8 is a graph showing a result of the differential scanning calorimetry measured on a core layer of polyethylene terephthalate foam.

FIG. 8 shows the result of the differential scanning calorimetry on the core layer of the skin/core structure formed from the amorphous polyethylene terephthalate through the gas impregnation at 40 degrees in centigrade under 80 kgf/cm$^2$. The exoergic peak due to the crystallization also took place, and the structure was close to the amorphous polyethylene terephthalate.

Figure 9:
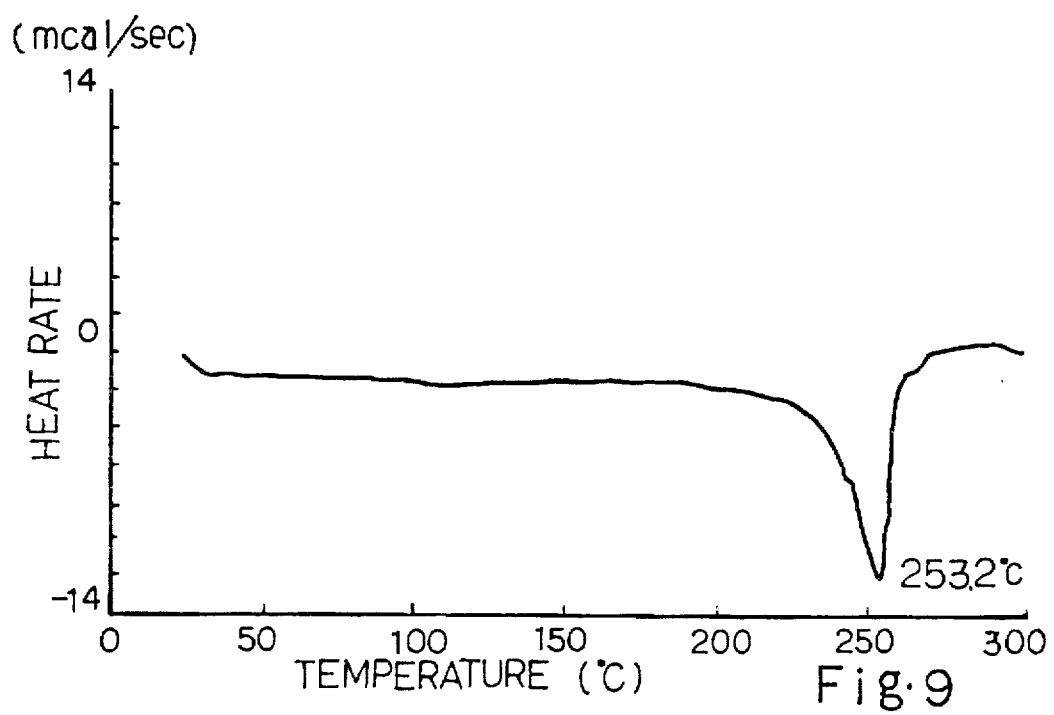
FIG. 9 is a graph showing a result of the differential scanning calorimetry measured on crystalline polyethylene terephthalate.

FIG. 9 shows the result of the differential scanning calorimetry on the crystalline polyethylene terephthalate obtained through a fusion of the amorphous polyethylene terephthalate and a slow cooling, and an exoergic peak was not observed.

Figure 10:
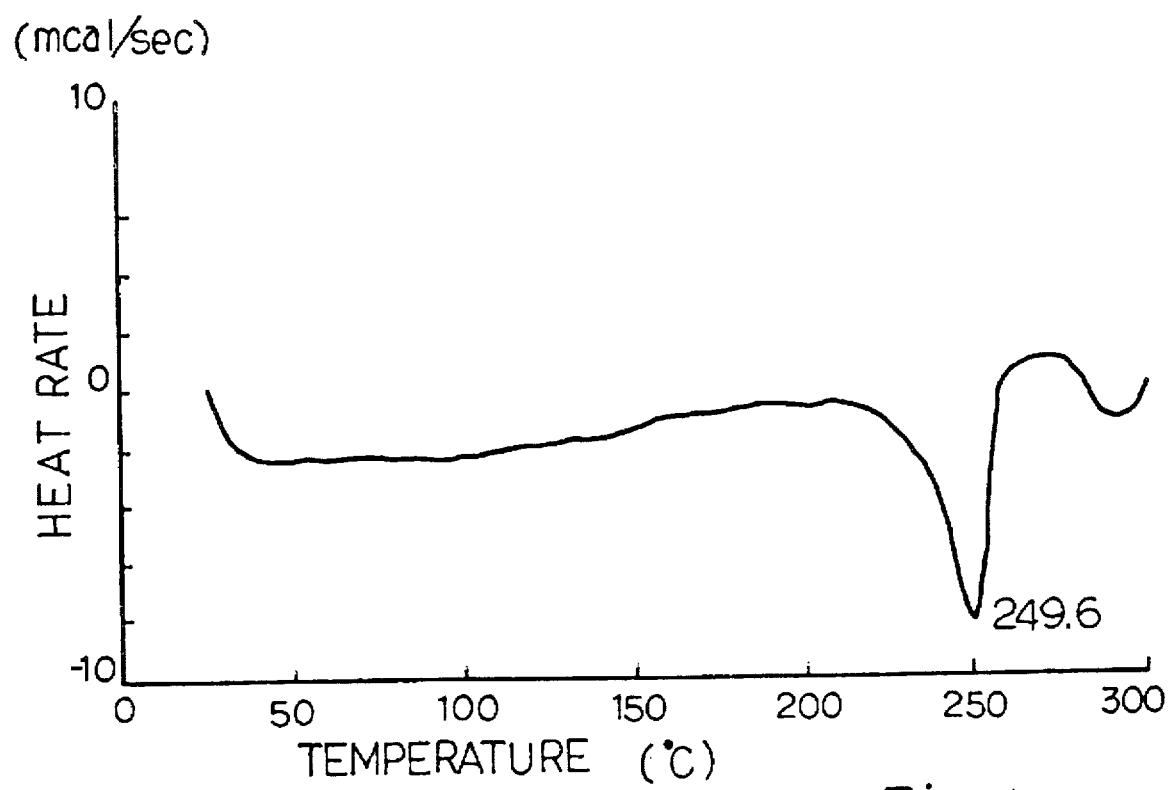
FIG. 10 is a graph showing a result of the differential scanning calorimetry measured on a skin layer of polyethylene terephthalate.

FIG. 10 shows the result of the differential scanning calorimetry on the skin layer of the skin/core structure of polyethylene terephthalate, and an exoergic peak did not take place.

Comparing FIG. 8 with FIG. 10, it is understood that the skin layer is higher in crystallinity than the core layer.

Second Embodiment

The present inventors prepared the polyethylene terephthalate sheets identical with those of the first embodiment, and the amorphous polyethylene terephthalate sheets were put in a pressure vessel. Carbon dioxide gas was impregnated into the amorphous polyethylene terephthalate sheets for twenty two hours under the same conditions of specimen 8 in Table 1.

After the gas impregnation, the gas-impregnated polyethylene terephthalate sheets were put into a mold, and, thereafter, were hot pressed. The gas-impregnated polyethylene terephthalate were heated over the glass-transition temperature of the polyethylene terephthalate, and were foamed. The polyethylene terephthalate foam was cooled, and the skin/core structures were obtained.

Non-crystalline thermoplastic resin sheets were further prepared. The non-crystalline thermoplastic resin was known as PETG (KODAR PETG6763 manufacturered by Eastman Kodak Corporation) and sold by Eastman Chemical Corporation. The carbon dioxide gas was impregnated into the non-crystalline thermoplastic resin sheets at 80 degrees in centigrade under 120 kgf/cm² for fifteen hours. The gas-impregnated sheets were hot pressed for foaming, and comparative samples were obtained. PETG6763 is manufacturered by replacing glycol of polyethylene terephthalate with 1.4-cyclohexane-dimethanol at 30 mol %, and is perfectly amorphous.

The present inventors measured the flexural rigidity and the flexural elastic modulus in accordance with JIS K-7203-1982. The results are shown in Table 2.

TABLE 2

|  | Second Emb. | Comparative sample |
| --- | --- | --- |
| Flexural rigidity (kgf/mm2) | 5.83 | 0.84 |
| Flexural elastic modulus | 198.69 | 27.49 |

The present inventors cut the samples implementing the second embodiment and the comparative samples, and observed the structures exposed to the cross sections. The samples of the second embodiment had the skin/core structure; however, the skin/core structure was not formed in the comparative samples.

Comparing the flexural rigidity and the flexural elastic modulus of the samples according to the present invention with those of the comparative samples, it is understood that the skin/core structure surely improves the mechanical properties of the synthetic resin foam.

As will be appreciated from the foregoing description, the skin/core structure according to the present invention improves the mechanical properties of the synthetic resin foam. Moreover, the skin layer is so smooth that the appearance of the structure of synthetic resin foam is attractive.

The process according to the present invention does not need toxic gas such as fleon gas, and is desirable in view of the environment protection. Moreover, the width of the skin layer is controllable by regulating the gas impregnating conditions, and the mechanical strength is adjustable.

The high-strength synthetic resin foam may be available for interior panels of a vehicle.

Although particular embodiments of the present invention have been shown and described, it will be obvious to those skilled in the art that various changes and modifications may be made without departing from the spirit and scope of the present invention.

What is claimed is:

1. A structure of synthetic resin foam comprising a skin layer of non-foamed thermoplastic resin, and a core layer of thermoplastic resin foam merged with said skin layer and lower in crystallinity than said skin layer, cells with an average diameter ranging from 0.1 micron to 10 microns forming said core layer.

2. The structure of synthetic resin foam as set forth in claim 1, in which said core layer is put between said skin layer and another skin layer of said thermoplastic resin foam.

3. The structure of synthetic resin foam as set forth in claim 1, in which said non-foamed thermoplastic resin and said thermoplastic resin foam are formed of a substance selected from the group consisting of polyethylene terephthalate, polybutylene terephthalate, polypropylene, polyethylene, polyamide and polyurethane.

4. The structure of synthetic resin foam as set forth in claim 1, in which said non-foamed thermoplastic resin and said thermoplastic resin foam contain at least one additive selected from the group consisting of a coloring agent, an antioxidant, an anti-static additive, a flame retarder, a lubricant and an ultraviolet ray absorbent.

5. A process of forming a structure of synthetic resin foam, comprising the steps of:

a) preparing bulk of crystallizable amorphous thermoplastic resin;

b) impregnating gas non-reactive with said crystallizable amorphous thermoplastic resin into said bulk of crystallizable amorphous thermoplastic resin at a predetermined temperature under a pressure of 80 kgf /cm² to 120 kgf /cm² so as to obtain a bulk of gas-impregnated material;

c) heating said bulk of gas-impregnated material to at least a glass-transition temperature of said thermoplastic resin for partially foaming said bulk of gas-impregnated material, thereby forming a core layer and a skin layer merged with said core layer and larger in crystallinity than said core layer; and d) cooling said core layer and said skin layer under said glass-transition temperature so as to obtain said structure of synthetic resin foam.

6. The process as set forth in claim 5, in which said crystallizable thermoplastic resin is selected from the group consisting of polyethylene terephthalate, polybutylene terephthalate, polypropylene, polyethylene, polyamide and polyurethane.

7. The process as set forth in claim 5, in which said crystallizable thermoplastic resin contains at least one additive selected from the group consisting of a coloring agent, an antioxidant, an anti-static additive, a flame retarder, a lubricant and an ultraviolet ray absorbent.

8. The process as set forth in claim 5, in which said crystallizable thermoplastic resin is polyethylene terephthalate, and said predetermined temperature ranges between 25 degrees in centigrade and 80 degrees in centigrade.

9. The process as set forth in claim 5, in which said gas non-reactive with said crystallizable thermoplastic resin is selected from the group consisting of carbon dioxide gas and nitrogen gas.

10. The process as set forth in claim 5, in which said step c) is carried out by dipping said bulk of gas-impregnated material into hot oil open to the atmosphere.

11. The process as set forth in claim 5, in which said step c) is carried out by using a hot pressing.

12. The process as set forth in claim 5, wherein step (b) forms cells in said bulk of gas-impregnated material with an average diameter ranging from 0.1 micron to 10 microns.

* * * * *